US011775265B2

(12) United States Patent
Tao et al.

(10) Patent No.: US 11,775,265 B2
(45) Date of Patent: Oct. 3, 2023

(54) METHOD AND SYSTEM FOR LIBRARY PACKAGE MANAGEMENT

(71) Applicant: JPMorgan Chase Bank, N.A., New York, NY (US)

(72) Inventors: Lili Tao, Bristol (GB); Sean Moran, London (GB); Sanat Saha, Mumbai (IN); Firas Daler, Mumbai (IN); Gaurav Singh, Mumbai (IN); Andy Alexander, St Albans (GB); Ganesh Chandrasekar, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 12 days.

(21) Appl. No.: 17/656,292

(22) Filed: Mar. 24, 2022

(65) Prior Publication Data
US 2023/0251834 A1 Aug. 10, 2023

(30) Foreign Application Priority Data
Feb. 9, 2022 (IN) .............................. 202211006853

(51) Int. Cl.
*G06F 8/36* (2018.01)
(52) U.S. Cl.
CPC ..................... *G06F 8/36* (2013.01)
(58) Field of Classification Search
None
See application file for complete search history.

(56) References Cited

U.S. PATENT DOCUMENTS

| 10,114,624 | B1* | 10/2018 | Makkar | G06F 9/30196 |
|---|---|---|---|---|
| 2014/0189668 | A1* | 7/2014 | Balasubramanian | G06F 8/36 717/163 |
| 2019/0079754 | A1* | 3/2019 | Makkar | G06F 8/73 |
| 2021/0349695 | A1* | 11/2021 | Duggal | A61M 21/02 |
| 2022/0091827 | A1* | 3/2022 | Makkar | G06F 8/77 |
| 2022/0206786 | A1* | 6/2022 | Silva | G06F 8/36 |

OTHER PUBLICATIONS

Theeten, "Import2vec Learning Embeddings for Software Libraries", 2019, IEEE (Year: 2019).*

* cited by examiner

*Primary Examiner* — Hossain M Morshed
(74) *Attorney, Agent, or Firm* — Greenblum & Bernstein, P.L.C.

(57) ABSTRACT

A method for automatically providing library package recommendations is disclosed. The method includes aggregating, via a communication interface, sets of source code from a repository, each of the sets of source code including a code snippet that relates to a portion of source code for a software program; initiating, by using a model, code context analysis of the code snippet to identify an alternative library package and a replaceable library package; performing, by using the model, implemented library analysis of the code snippet to determine a complementary library package; generating recommendations for the code snippet, the recommendations including information that relates to the complementary library package, the alternative library package, and the replaceable library package; and associating, in the repository, the generated recommendations with the code snippet.

20 Claims, 6 Drawing Sheets

METHOD AND SYSTEM FOR LIBRARY PACKAGE MANAGEMENT

CROSS-REFERENCE TO RELATED APPLICATIONS

This application claims the benefit of Indian Provisional Patent Application No. 202211006853, filed Feb. 9, 2022, which is hereby incorporated by reference in its entirety.

BACKGROUND

1. Field of the Disclosure

This technology generally relates to methods and systems for managing library packages, and more particularly to methods and systems for automatically providing library package recommendations by using models to analyze code snippets and implemented software systems.

2. Background Information

Many entities utilize large collections of library packages such as, for example, open-source library packages to facilitate software development and data analysis. Often, new library packages are added daily to the ever-growing collections of library packages due to rapidly evolving standard practices across various data science tasks such as, for example, natural language processing, topic modelling and understanding, topic classifying, as well as topic clustering. Historically, implementations of conventional library package management techniques have resulted in varying degrees of success with respect to improving source code management and software quality.

One drawback of the conventional library package management techniques is that in many instances, integrations of the newly added library packages rely on familiarity with the ever-growing collections of library packages. As a result, the integrations of the newly added library packages, which may include critical functionality enhancements, are inconsistent due to the rapid rate of change in the collections of library packages. Additionally, the newly added library packages may include requirements such as, for example, application programming interface requirements that are incompatible with implemented software systems in existing development projects.

Therefore, there is a need to manage library packages by using models to analyze code snippets and implemented software systems to automatically recommend complementary, alternative, and replaceable library packages.

SUMMARY

The present disclosure, through one or more of its various aspects, embodiments, and/or specific features or sub-components, provides, inter alia, various systems, servers, devices, methods, media, programs, and platforms for automatically providing library package recommendations by using models to analyze code snippets and implemented software systems.

According to an aspect of the present disclosure, a method for automatically providing library package recommendations is disclosed. The method is implemented by at least one processor. The method may include aggregating, via a communication interface, at least one set of source code from at least one repository, each of the at least one set of source code may include a code snippet that relates to a portion of source code for a software program; initiating, by using at least one model, code context analysis of the at least one code snippet to identify at least one alternative library package and at least one replaceable library package; performing, by using the at least one model, implemented library analysis of the at least one code snippet to determine at least one complementary library package; generating at least one recommendation for the at least one code snippet, the at least one recommendation may include information that relates to the at least one complementary library package, the at least one alternative library package, and the at least one replaceable library package; and associating, in the at least one repository, the generated at least one recommendation with the at least one code snippet.

In accordance with an exemplary embodiment, the at least one repository may correspond to at least one integrated development environment that facilitates development of the software program.

In accordance with an exemplary embodiment, to initiate the code context analysis, the method may further include generating, by using the at least one model, at least one tag for the at least one code snippet, the at least one tag may include a textual description of a function that corresponds to the at least one code snippet; and identifying, in a library candidates dataset, at least one alternative library package and at least one replaceable library package based on the generated at least one tag.

In accordance with an exemplary embodiment, the at least one alternative library package may include at least one alternative function that is similar to a function that is implemented in a library package used by the at least one code snippet; and wherein the at least one replaceable library package may include at least one interchangeable function that is usable to replace the function that is implemented in the library package used by the at least one code snippet.

In accordance with an exemplary embodiment, to perform the implemented library analysis, the method may further include detecting at least one implemented library package that is associated with the at least one code snippet; and determining, by using the at least one model, at least one complementary library package that is frequently used together with the at least one implemented library package.

In accordance with an exemplary embodiment, the method may further include receiving an indication that at least one new library package has been added to the at least one repository; determining whether the at least one new library package satisfies a predetermined threshold; and updating, based on a result of the determining, the at least one model with information that relates to the at least one new library package.

In accordance with an exemplary embodiment, the information that relates to the at least one new library package may include a weighted average of at least one co-occurring library package that is implemented together with the at least one new library package, the weighted average may represent a number of implementations that includes the at least one co-occurring library package and the at least one new library package.

In accordance with an exemplary embodiment, the method may further include generating at least one interface recommendation for the at least one code snippet, the at least one interface recommendation may include at least one application programming interface that is operable with the at least one complementary library package, the at least one alternative library package, and the at least one replaceable library package; and associating, in the at least one repository, the generated at least one interface recommendation with the at least one code snippet.

In accordance with an exemplary embodiment, the at least one model may include at least one from among a machine learning model, a mathematical model, a process model, and a data model.

According to an aspect of the present disclosure, a computing device configured to implement an execution of a method for automatically providing library package recommendations is disclosed. The computing device including a processor; a memory; and a communication interface coupled to each of the processor and the memory, wherein the processor may be configured to aggregate, via the communication interface, at least one set of source code from at least one repository, each of the at least one set of source code may include a code snippet that relates to a portion of source code for a software program; initiate, by using at least one model, code context analysis of the at least one code snippet to identify at least one alternative library package and at least one replaceable library package; perform, by using the at least one model, implemented library analysis of the at least one code snippet to determine at least one complementary library package; generate at least one recommendation for the at least one code snippet, the at least one recommendation may include information that relates to the at least one complementary library package, the at least one alternative library package, and the at least one replaceable library package; and associate, in the at least one repository, the generated at least one recommendation with the at least one code snippet.

In accordance with an exemplary embodiment, the at least one repository may correspond to at least one integrated development environment that facilitates development of the software program.

In accordance with an exemplary embodiment, to initiate the code context analysis, the processor may be further configured to generate, by using the at least one model, at least one tag for the at least one code snippet, the at least one tag may include a textual description of a function that corresponds to the at least one code snippet; and identify, in a library candidates dataset, at least one alternative library package and at least one replaceable library package based on the generated at least one tag.

In accordance with an exemplary embodiment, the at least one alternative library package may include at least one alternative function that is similar to a function that is implemented in a library package used by the at least one code snippet; and wherein the at least one replaceable library package may include at least one interchangeable function that is usable to replace the function that is implemented in the library package used by the at least one code snippet.

In accordance with an exemplary embodiment, to perform the implemented library analysis, the processor may be further configured to detect at least one implemented library package that is associated with the at least one code snippet; and determine, by using the at least one model, at least one complementary library package that is frequently used together with the at least one implemented library package.

In accordance with an exemplary embodiment, the processor may be further configured to receive an indication that at least one new library package has been added to the at least one repository; determine whether the at least one new library package satisfies a predetermined threshold; and update, based on a result of the determining, the at least one model with information that relates to the at least one new library package.

In accordance with an exemplary embodiment, the information that relates to the at least one new library package may include a weighted average of at least one co-occurring library package that is implemented together with the at least one new library package, the weighted average may represent a number of implementations that includes the at least one co-occurring library package and the at least one new library package.

In accordance with an exemplary embodiment, the processor may be further configured to generate at least one interface recommendation for the at least one code snippet, the at least one interface recommendation may include at least one application programming interface that is operable with the at least one complementary library package, the at least one alternative library package, and the at least one replaceable library package; and associate, in the at least one repository, the generated at least one interface recommendation with the at least one code snippet.

In accordance with an exemplary embodiment, the at least one model may include at least one from among a machine learning model, a mathematical model, a process model, and a data model.

According to an aspect of the present disclosure, a non-transitory computer readable storage medium storing instructions for automatically providing library package recommendations is disclosed. The storage medium including executable code which, when executed by a processor, may cause the processor to aggregate, via a communication interface, at least one set of source code from at least one repository, each of the at least one set of source code may include a code snippet that relates to a portion of source code for a software program; initiate, by using at least one model, code context analysis of the at least one code snippet to identify at least one alternative library package and at least one replaceable library package; perform, by using the at least one model, implemented library analysis of the at least one code snippet to determine at least one complementary library package; generate at least one recommendation for the at least one code snippet, the at least one recommendation may include information that relates to the at least one complementary library package, the at least one alternative library package, and the at least one replaceable library package; and associate, in the at least one repository, the generated at least one recommendation with the at least one code snippet.

In accordance with an exemplary embodiment, the at least one model may include at least one from among a machine learning model, a mathematical model, a process model, and a data model.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
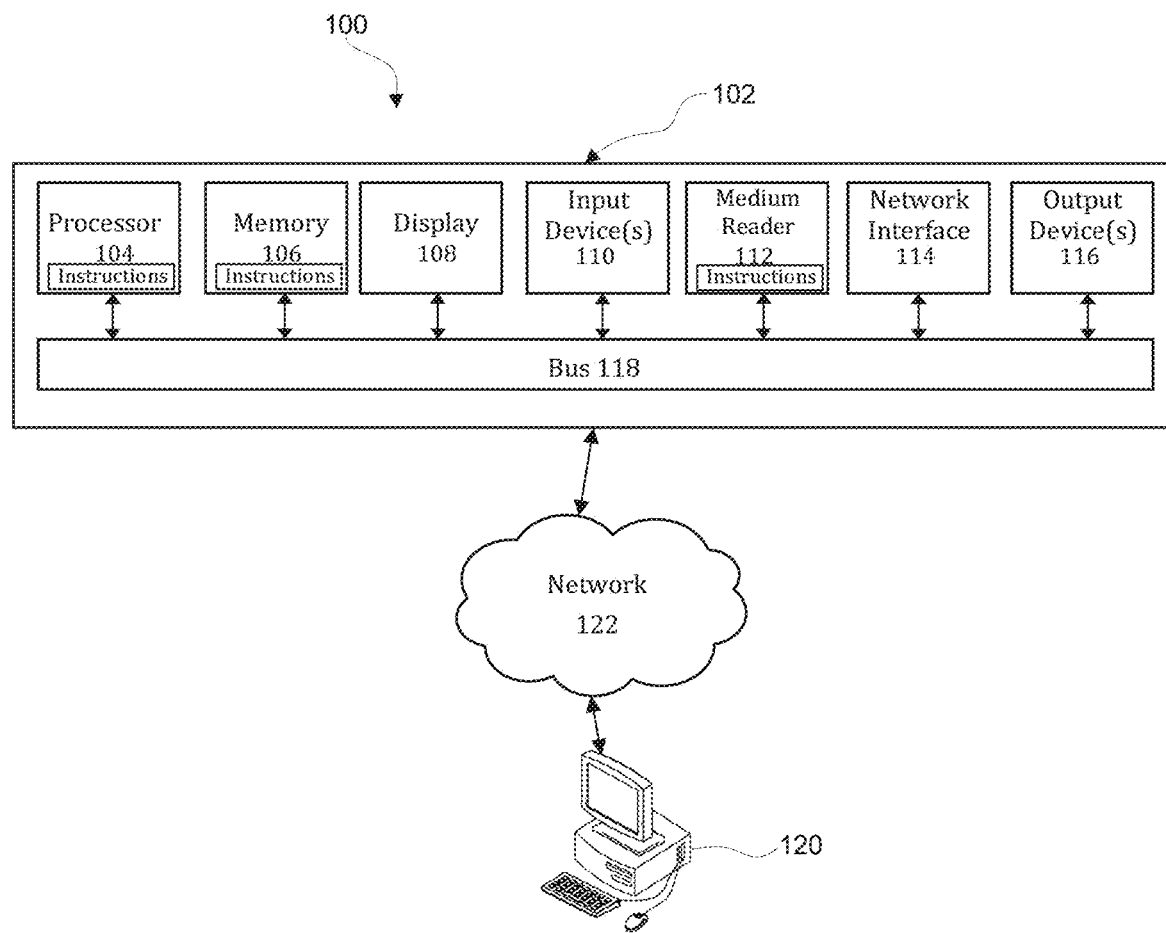
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automatically providing library package recommendations by using models to analyze code snippets and implemented software systems.

Figure 2:
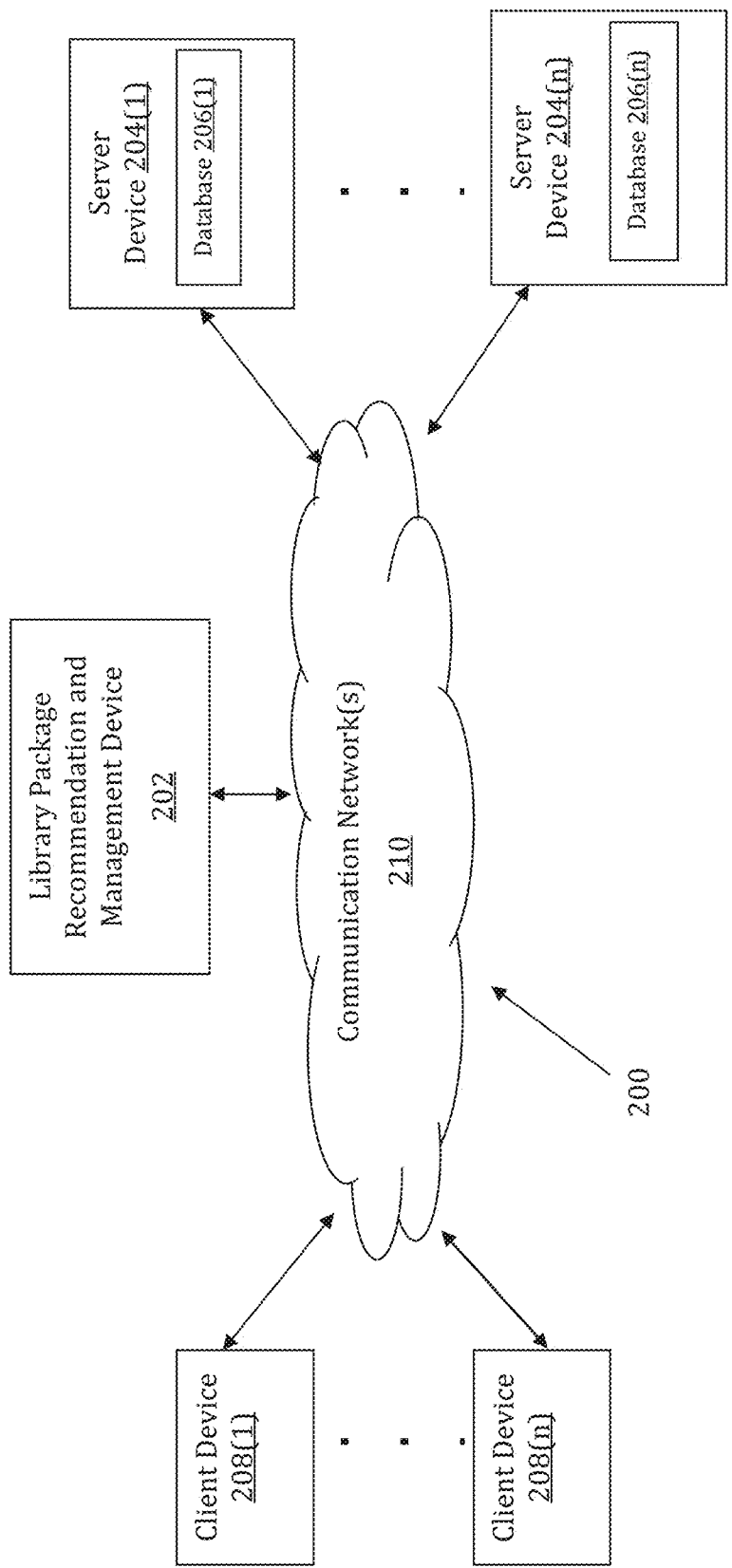
FIG. 2 illustrates an exemplary diagram of a network environment.

Referring to FIG. 2, a schematic of an exemplary network environment 200 for implementing a method for automatically providing library package recommendations by using models to analyze code snippets and implemented software systems is illustrated. In an exemplary embodiment, the method is executable on any networked computer platform, such as, for example, a personal computer (PC).

The method for automatically providing library package recommendations by using models to analyze code snippets and implemented software systems may be implemented by a Library Package Recommendation and Management (LPRM) device 202. The LPRM device 202 may be the same or similar to the computer system 102 as described with respect to FIG. 1. The LPRM device 202 may store one or more applications that can include executable instructions that, when executed by the LPRM device 202, cause the LPRM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the LPRM device 202 itself, may be located in virtual server(s) running in a cloud-based computing environment rather than being tied to one or more specific physical network computing devices. Also, the application(s) may be running in one or more virtual machines (VMs) executing on the LPRM device 202. Additionally, in one or more embodiments of this technology, virtual machine(s) running on the LPRM device 202 may be managed or supervised by a hypervisor.

In the network environment 200 of FIG. 2, the LPRM device 202 is coupled to a plurality of server devices 204(1)-204(n) that hosts a plurality of databases 206(1)-206(n), and also to a plurality of client devices 208(1)-208(n) via communication network(s) 210. A communication interface of the LPRM device 202, such as the network interface 114 of the computer system 102 of FIG. 1, operatively couples and communicates between the LPRM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the LPRM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and LPRM devices that efficiently implement a method for automatically providing library package recommendations by using models to analyze code snippets and implemented software systems.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The LPRM device 202 may be a standalone device or integrated with one or more other devices or apparatuses, such as one or more of the server devices 204(1)-204(n), for example. In one particular example, the LPRM device 202 may include or be hosted by one of the server devices 204(1)-204(n), and other arrangements are also possible. Moreover, one or more of the devices of the LPRM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the LPRM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to sets of source code, code snippets, software programs, machine learning models, alternative library packages, replaceable library packages, complementary library packages, library package recommendations, code tags, new library packages, weighted averages, and application programming interface recommendations.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the LPRM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the LPRM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the LPRM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the LPRM device 202, the server devices 204(1)-204(n), or the client devices 208(1)-208(n), for example, may be configured to operate as virtual instances on the same physical machine. In other words, one or more of the LPRM device 202, the server devices 204(1)-204(n), or the client devices 208(1)-208(n) may operate on the same physical device rather than as separate devices communicating through communication network(s) 210. Additionally, there may be more or fewer LPRM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
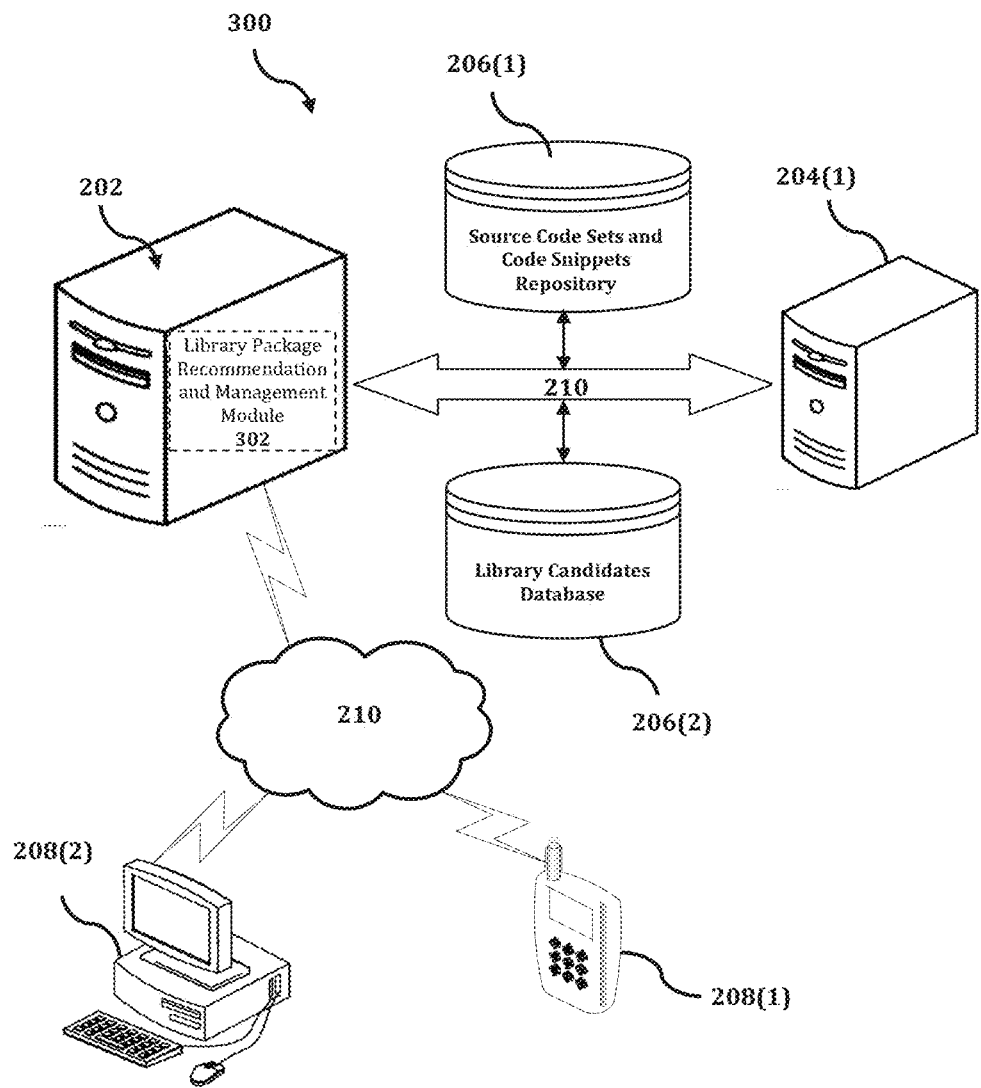
FIG. 3 shows an exemplary system for implementing a method for automatically providing library package recommendations by using models to analyze code snippets and implemented software systems.

The LPRM device 202 is described and shown in FIG. 3 as including a library package recommendation and management module 302, although it may include other rules, policies, modules, databases, or applications, for example. As will be described below, the library package recommendation and management module 302 is configured to implement a method for automatically providing library package recommendations by using models to analyze code snippets and implemented software systems.

An exemplary process 300 for implementing a mechanism for automatically providing library package recommendations by using models to analyze code snippets and implemented software systems by utilizing the network environment of FIG. 2 is shown as being executed in FIG. 3. Specifically, a first client device 208(1) and a second client device 208(2) are illustrated as being in communication with LPRM device 202. In this regard, the first client device 208(1) and the second client device 208(2) may be "clients" of the LPRM device 202 and are described herein as such. Nevertheless, it is to be known and understood that the first client device 208(1) and/or the second client device 208(2) need not necessarily be "clients" of the LPRM device 202, or any entity described in association therewith herein. Any additional or alternative relationship may exist between either or both of the first client device 208(1) and the second client device 208(2) and the LPRM device 202, or no relationship may exist.

Further, LPRM device 202 is illustrated as being able to access a source code sets and code snippets repository 206(1) and a library candidates database 206(2). The library package recommendation and management module 302 may be configured to access these databases for implementing a method for automatically providing library package recommendations by using models to analyze code snippets and implemented software systems.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the LPRM device 202 via broadband or cellular communication. Of course, these embodiments are merely exemplary and are not limiting or exhaustive.

Upon being started, the library package recommendation and management module 302 executes a process for automatically providing library package recommendations by using models to analyze code snippets and implemented software systems. An exemplary process for automatically providing library package recommendations by using models to analyze code snippets and implemented software systems is generally indicated at flowchart 400 in FIG. 4.

Figure 4:
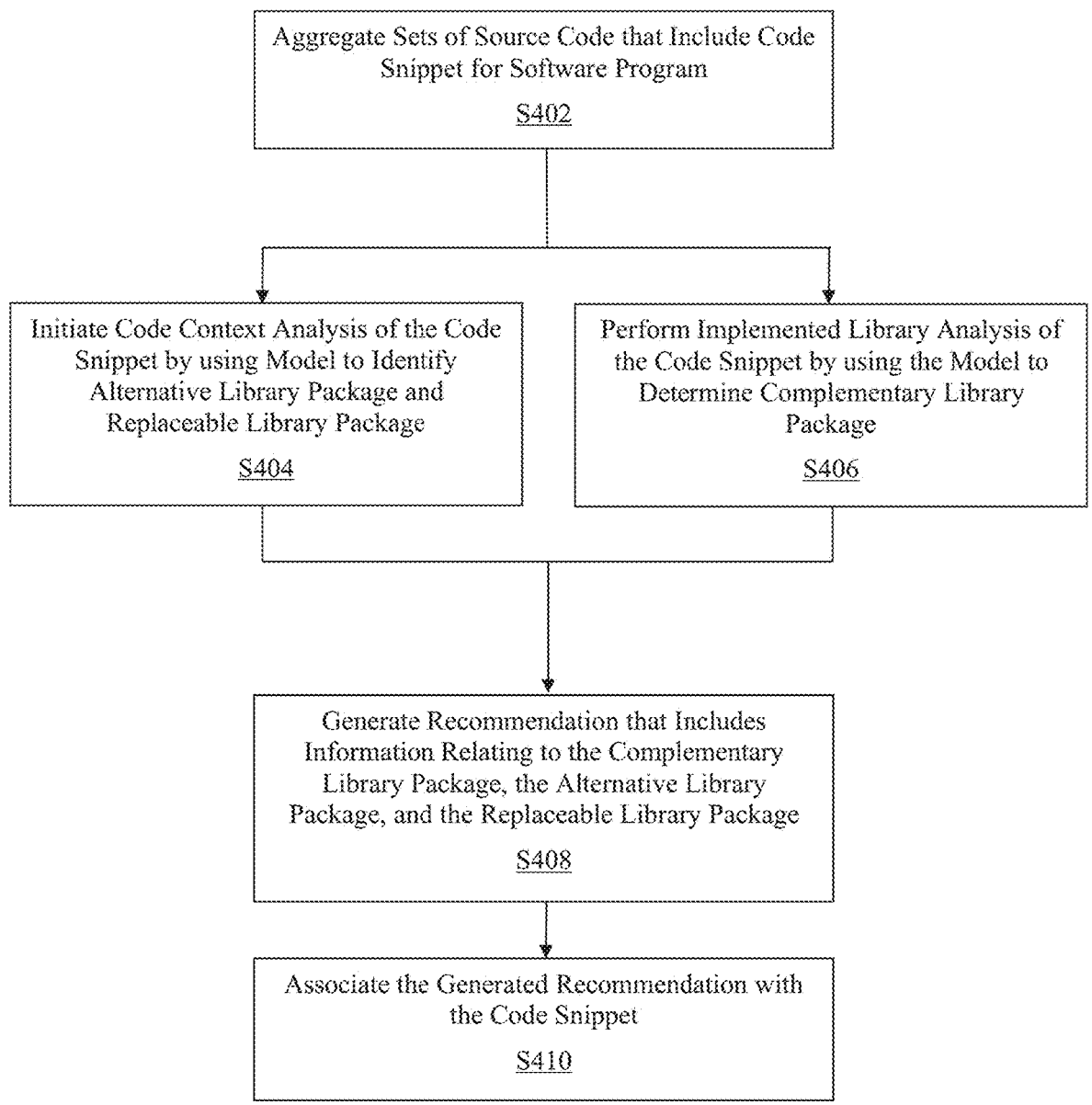
FIG. 4 is a flowchart of an exemplary process for implementing a method for automatically providing library package recommendations by using models to analyze code snippets and implemented software systems.

In the process 400 of FIG. 4, at step S402, sets of source code may be aggregated from a repository. Each of the sets of source code may include a code snippet that relates to a portion of source code for a software program. In an exemplary embodiment, the sets of source code may relate to a text listing of commands to be compiled and/or assembled into an executable computer program. The text listing of commands may be written by using a computer programming language such as, for example, PYTHON. In another exemplary embodiment, the code snippet may relate to a region of re-usable source code, machine code, or text. The code snippet may correspond to formally defined operative units that may be incorporated into larger programming modules.

In another exemplary embodiment, the repository may correspond to an integrated development environment (IDE) such as, for example, a JUPYTER development environment that facilitates development of the software program. The IDE may include a computing environment that corresponds to any computer programming language. In another exemplary embodiment, the IDE may include at least one from among a source code editor, a build automation tool, a debugger, a compiler, and an interpreter. For example, the IDE may correspond to an open-source web application that allows data scientists to create and share documents that integrate live code, equations, computational output, visualizations, and other multimedia resources together with explanatory text in a single document.

At step S404, code context analysis of the code snippet may be initiated to identify an alternative library package and a replaceable library package. The code context analysis may be initiated by using a model. In an exemplary embodiment, the alternative library package may relate to a different and/or better library package for a developer to consider and the replaceable library package may relate to a library package that may be used to replace the developer's own implementation. For example, when a developer uses a particular library package, the alternative library package may correspond to a different and/or better library package for the developer to consider. Similarly, when a developer uses a particular library package, the replaceable library package may correspond to a library package that may be used instead of the particular library package.

In another exemplary embodiment, the library package may relate to a collection of non-volatile resources that are used by a computer program in software development. The library package may include configuration data, documentation, help data, message templates, pre-written code, and subroutines, classes, values, and type specifications. In another exemplary embodiment, the library package may correspond to at least one from among an open-source library package and a proprietary library package. Each of the open-source library package and the proprietary library package may be developed by a first-party developer as well as a third-party developer.

In another exemplary embodiment, the library package may correspond to a collection of implementation behaviors, which are written in terms of a language, that has a well-defined interface by which the behavior is invoked. For example, a developer writing a higher-level program may use a library package to make system calls instead of implementing each of the system calls repeatedly in the source code. In another exemplary embodiment, library package code may be organized so that the library package may be used by multiple programs that do not have a connection to one another.

In another exemplary embodiment, initiating the code context analysis may include generating a tag for the code snippet by using the model. The tag may include a textual description of a function that corresponds to the code snippet. Then, the alternative library package and the replaceable library package may be identified based on the generated tag. The alternative library package and the replaceable library package may be identified from a library candidates dataset.

In another exemplary embodiment, the alternative library package may include an alternative function that is similar to a function that is implemented in a library package used by the code snippet. For example, the alternative library package and the library packages that are currently used by the code snippet may implement similar functions. In another exemplary embodiment, the replaceable library package may include an interchangeable function that is usable to replace the function that is implemented in the library package used by the code snippet. For example, the replaceable library package may include an open-source library package that may be used to replace the library package used by the code snippet.

In another exemplary embodiment, the model and the tag that corresponds to the code snippet may facilitate understanding of source code topics in the code snippet to assist in selection of relevant libraries that may be more efficient for algorithm implementation. To implement code summarization, a bimodal pre-trained model for natural language and programming language may be used. The bimodal pre-trained model may capture semantic connections between natural language and programming language, which produces general purpose representations that may broadly support natural language and programming language understanding tasks. The bimodal pre-trained model may be applied to generate a text description of each function within a cell and concatenate the text description as a query.

In another exemplary embodiment, to implement library retrieval, relevant library packages may be identified in the library candidates dataset by using the tag and the model. The library candidates dataset may include a plurality of library packages with associated descriptions and keywords. In another exemplary embodiment, relevancy of any particular library package in the library candidates dataset to the code snippet may be determined by matching the code snippet tag, and any associated descriptions, with descriptions for each of the library packages in the library candidates dataset.

In another exemplary embodiment, the model may include at least one from among a machine learning model, a statistical model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, K-fold cross-validation analysis, balanced class weight analysis, etc. In another exemplary embodiment, machine learning analytical techniques may include unsupervised learning algorithms such as, for example, Apriori analysis, K-means clustering analysis, isolation forest analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

At step S406, implemented library analysis of the code snippet may be performed to determine complementary library packages. The implemented library analysis may be performed by using the model. Consistent with present disclosures, the library package may relate to a collection of non-volatile resources that are used by a computer program in software development. The library package may include configuration data, documentation, help data, message templates, pre-written code, and subroutines, classes, values, and type specifications. Consistent with present disclosures, the library package may correspond to at least one from among an open-source library package and a proprietary library package. Each of the open-source library package and the proprietary library package may be developed by a first-party developer as well as a third-party developer.

In another exemplary embodiment, performing the implemented library analysis may include detecting an implemented library package that is associated with the code snippet. The implemented library package may correspond to a library package that is currently used by the code snippet. Then, complementary library packages that are frequently used together with the implemented library package may be determined. The complementary library packages may be determined by using the model.

In another exemplary embodiment, sets of library packages that are frequently used together with the implemented library packages may have similar usage contexts as the implemented library packages. Consistent with present disclosures, the complementary library packages may be determined for use with the implemented library packages based on the similar usage contexts. In another exemplary embodiment, the similar usage contexts may be determined based on semantic similarities among the library packages in the repository. The semantic similarities may correspond to a positive example pair and may be graphically represented by a graphical element such as, for example, a graph to visually illustrate clustering of data points that correspond to similar library packages. The graphical element may be displayed via a graphical user interface for a user.

In another exemplary embodiment, library package embeddings may be used to train a skip-gram model based on the implemented library packages. For any two library package imports, a determination may be made as to whether the pair is a positive example or a negative example. A positive example pair may indicate that a target library package co-occurred with a context library within a source file of at least one project and thus share semantic similarities. A negative example pair may indicate that the target library and the context library are not imported together in any source file of any project in the entire library candidates dataset.

In another exemplary embodiment, the model may be updated for unseen library packages. The unseen library packages may correspond to library packages that are newly added to the library candidates dataset and have not been included in the general training data. For the new library packages, rather than re-train the model, the model may learn the embedding by projecting the new library packages to a latent space. The embedding of the new library packages may be based on a predetermined threshold. The predetermined threshold may relate to a criterion for updating the model such as, for example, an update criterion specifying that the model is updated with the new library package when the new library package appears more than five times in new repositories but has not been included in the original training data.

In another exemplary embodiment, the new embedding that corresponds to the new library package may be calculated by the weighted average of, a variable "N," co-occurring libraries in the same file, with the weight representing the number of times the pair appears together.

The weighted average may be represented as:

$$\frac{\sum_{i=1}^{N} w_i P_i}{\sum_{i=1}^{N} w_i},$$

where weights $W_I$ is number of times the unseen library co-occurred with library $P_I$.

At step S408, a recommendation for the code snippet may be generated. The recommendation may include information that relates to the complementary library package, the alternative library package, and the replaceable library package. In an exemplary embodiment, the recommendation may be based on the code context analysis and the implemented library analysis of the code snippet. As will be appreciated by a person of ordinary skill in the art, the claimed invention may correspond to a text-based implementation which does not need to create a grammar and a parser for the source code. The text-based implementation saves a significant amount of engineering work.

The recommendation may include library packages that are relevant to the code snippet based on a heuristic determination according to predetermined scenarios. For example, the predetermined scenarios may include a first scenario, a second scenario, a third scenario, and a fourth scenario. In the first scenario, the relevant library packages may have been frequently used with the implemented library packages in the code snippet. In the second scenario, the relevant library packages may have similar functionalities to the implemented library packages in the code snippet. In the third scenario, the relevant library packages may have similar functionalities to the developer's implementation. In the fourth scenario, the relevant library packages may be used efficiently in the context of the code snippet.

At step S410, the generated recommendation may be associated with the code snippet. The generated recommendation may be associated with the code snippet in the repository. In an exemplary embodiment, an alerting action may be automatically initiated based on a result of the association. The alerting action may include generation of a notification for sending to a user who is associated with the code snippet. The notification may include information that relates to the generated recommendation, the complementary library packages, the alternative library packages, and the replaceable library packages.

In another exemplary embodiment, the alerting action may include generation of an event and/or a work item such as, for example, a ticket that must be investigated and addressed. The event and/or work item may be assigned to a user who is associated with the code snippet. The event and/or work item may include information that relates to the generated recommendation, the complementary library packages, the alternative library packages, and the replaceable library packages.

In another exemplary embodiment, updating the model may include receiving an indication that new library packages have been added to the repository. The new library packages may correspond to unseen library packages that are newly added to the library candidates dataset and have not been included in the general training data. Then, consistent with present disclosures, a determination may be made as to whether the new library packages satisfy a predetermined threshold. The model may be updated with information that relates to the new library packages based on a result of the determining. In another exemplary embodiment, the information that relates to the new library packages may include a weighted average of a co-occurring library package that is implemented together with the new library package. The weighted average may represent a number of implementations that includes the co-occurring library package and the new library package.

In another exemplary embodiment, additional component recommendations such as, for example, an interface recommendation may be made for the code snippet based on the code context analysis and the implemented library analysis. Recommending an interface component may include generating an interface recommendation for the code snippet. The interface recommendation may include an application programming interface (API) that is operable with the complementary library package, the alternative library package, and the replaceable library package. For example, APIs that work with each of the complementary library package, the alternative library package, and the replaceable library package may be recommended for use with the code snippet based on similarities between the library packages implemented in the code snippet and the aforementioned library packages. Then, consistent with present disclosures, the generated interface recommendation may be associated with the code snippet in the repository.

Figure 5:
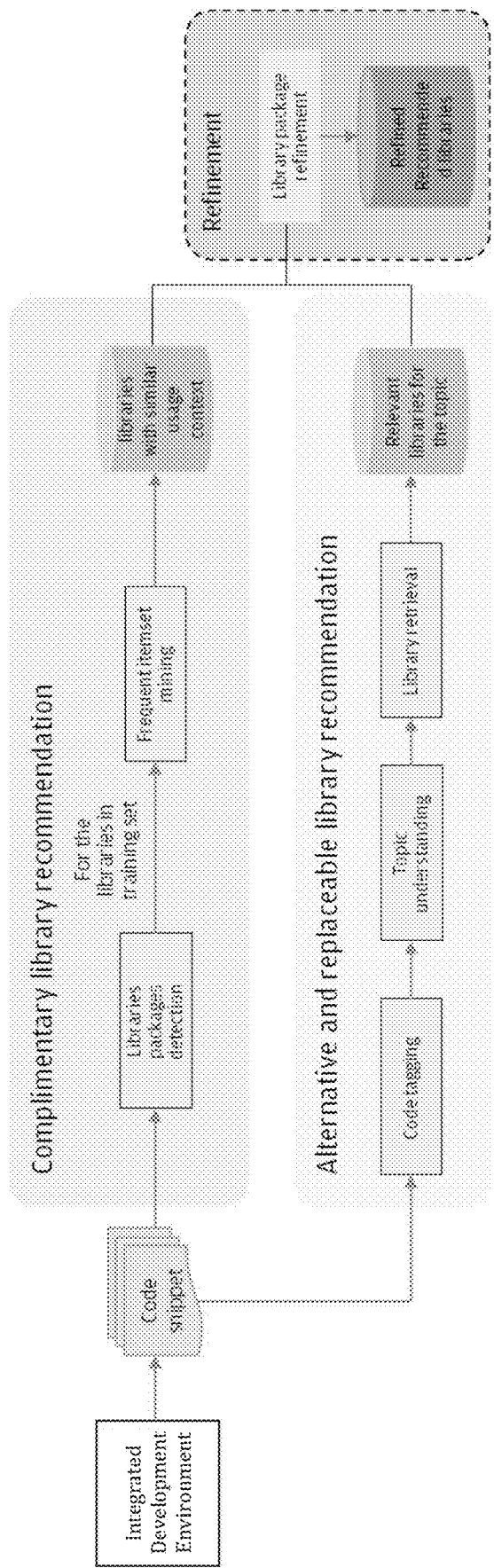
FIG. 5 is a flow diagram of an exemplary process for implementing a method for automatically providing library package recommendations by using models to analyze code snippets and implemented software systems.

FIG. 5 is a flow diagram 500 of an exemplary process for implementing a method for automatically providing library package recommendations by using models to analyze code snippets and implemented software systems. In FIG. 5, the complementary library recommendation process as well as the alternative and replaceable library recommendation process may be implanted independently as separate processes.

As illustrated in FIG. 5, code snippets may be aggregated from an integrated development environment (IDE). Consistent with present disclosures, the code snippets may be aggregated from any IDE that uses library packages such as, for example, open-source library packages in any programming languages. For the complementary library recommendation process, the code snippets may be analyzed to detect implemented library packages. Frequent itemset mining may be implemented by a machine learning model for implemented library packages that are in the training set. Then, library packages with similar usage context may be identified in a library candidates dataset and passed to a refinement component for further processing.

For the alternative and replaceable library recommendation process, the code snippets may be analyzed and tagged. The machine learning model may use the tags to understand topics that corresponds to the code snippet. A library retrieval action may be initiated based on the understood topics to identify relevant library packages in the library candidates dataset for the topics. Then, the identified relevant library packages may be passed to the refinement component for further processing.

In another exemplary embodiment, the refinement component may receive as input the relevant library packages from the complementary library recommendation process as well as the alternative and replaceable library recommendation process. The refinement component may initiate a library package refinement action to refine the recommended libraries. In another exemplary embodiment, the library package refinement action may refine the recommended libraries by reducing false positives. To reduce the false positives, the recommended libraries may be associated with a hard label that compares the recommended library packages with manually annotated, expected library packages. The recommended libraries may also be associated with a soft label that takes into account the description of recommended libraries and use the same information retrieval algorithm to get a list of ground truth library packages for comparison with the relevant library packages.

Figure 6:
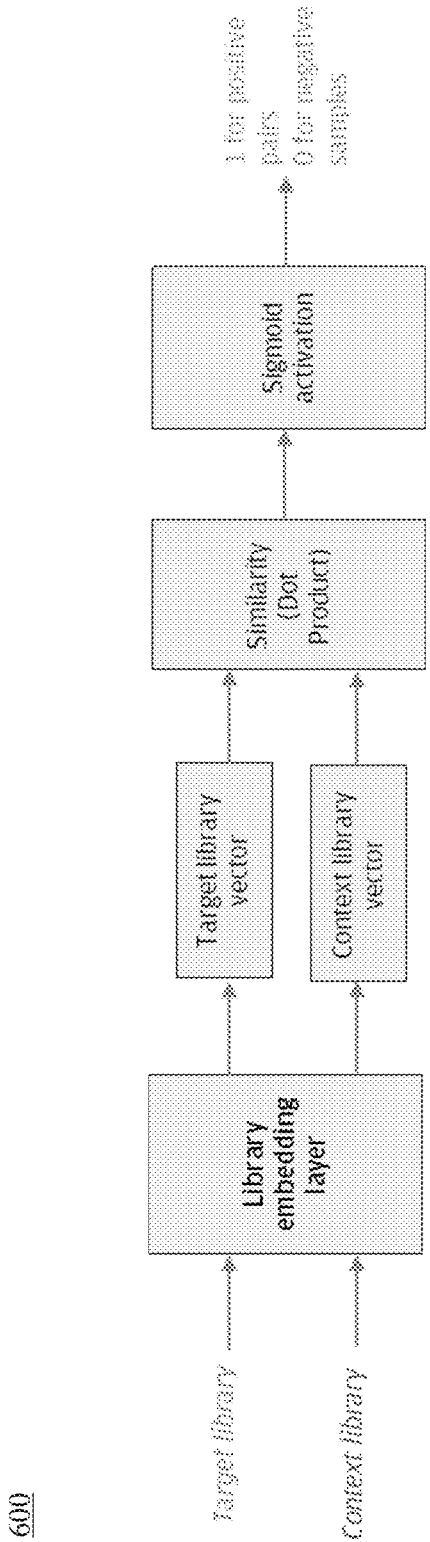
FIG. 6 is a flow diagram of an exemplary imported library training process for implementing a method for automatically providing library package recommendations by using models to analyze code snippets and implemented software systems.

FIG. 6 is a flow diagram 600 of an exemplary imported library training process for implementing a method for automatically providing library package recommendations by using models to analyze code snippets and implemented software systems. In FIG. 6, library package embeddings may be used to train a skip-gram model based on the implemented library packages. For any two library package imports, a determination may be made as to whether the pair is a positive example or a negative example. A positive example pair may indicate that a target library package co-occurred with a context library within a source file of at least one project. A negative example pair may indicate that the target library and the context library are not imported together in any source file of any project in the entire library candidates dataset.

As illustrated in FIG. 6, a target library package and a context library package may be inputted into a library embedding layer. The library embedding layer may generate a target library vector based on the target library package and a context library vector based on the context library package. A dot product may be determined by a similarity component based on the target library vector and the context library vector. A sigmoid activation component may then determine whether the target library package and the context library package are a positive example or a negative example. The sigmoid activation component may output a number between zero and one based on the similarity between the context library package and the target library package.

Accordingly, with this technology, an optimized process for automatically providing library package recommendations by using models to analyze code snippets and implemented software systems is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any sub sequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically providing library package recommendations, the method being implemented by at least one processor, the method comprising:
    aggregating, by the at least one processor via a communication interface, at least one set of source code from at least one repository, each of the at least one set of source code including a code snippet that relates to a portion of source code for a software program;
    initiating, by the at least one processor using at least one model, code context analysis of the at least one code snippet to identify at least one alternative library package and at least one replaceable library package;
    performing, by the at least one processor using the at least one model, implemented library analysis of the at least one code snippet to determine at least one complementary library package;
    generating, by the at least one processor, at least one recommendation for the at least one code snippet, the at least one recommendation including information that relates to the at least one complementary library package, the at least one alternative library package, and the at least one replaceable library package; and
    associating, by the at least one processor in the at least one repository, the generated at least one recommendation with the at least one code snippet.

2. The method of claim 1, wherein the at least one repository corresponds to at least one integrated development environment that facilitates development of the software program.

3. The method of claim 1, wherein initiating the code context analysis further comprises:
    generating, by the at least one processor using the at least one model, at least one tag for the at least one code snippet, the at least one tag including a textual description of a function that corresponds to the at least one code snippet; and
    identifying, by the at least one processor in a library candidates dataset, at least one alternative library package and at least one replaceable library package based on the generated at least one tag.

4. The method of claim 3, wherein the at least one alternative library package includes at least one alternative function that is similar to a function that is implemented in a library package used by the at least one code snippet; and wherein the at least one replaceable library package includes at least one interchangeable function that is usable to replace the function that is implemented in the library package used by the at least one code snippet.

5. The method of claim 1, wherein performing the implemented library analysis further comprises:
    detecting, by the at least one processor, at least one implemented library package that is associated with the at least one code snippet; and
    determining, by the at least one processor using the at least one model, at least one complementary library package that is frequently used together with the at least one implemented library package.

6. The method of claim 1, further comprising:
    receiving, by the at least one processor, an indication that at least one new library package has been added to the at least one repository;
    determining, by the at least one processor, whether the at least one new library package satisfies a predetermined threshold; and updating, by the at least one processor based on a result of the determining, the at least one model with information that relates to the at least one new library package.

7. The method of claim 6, wherein the information that relates to the at least one new library package includes a weighted average of at least one co-occurring library package that is implemented together with the at least one new library package, the weighted average representing a number of implementations that includes the at least one co-occurring library package and the at least one new library package.

8. The method of claim 1, further comprising:
generating, by the at least one processor, at least one interface recommendation for the at least one code snippet, the at least one interface recommendation including at least one application programming interface that is operable with the at least one complementary library package, the at least one alternative library package, and the at least one replaceable library package; and
associating, by the at least one processor in the at least one repository, the generated at least one interface recommendation with the at least one code snippet.

9. The method of claim 1, wherein the at least one model includes at least one from among a machine learning model, a mathematical model, a process model, and a data model.

10. A computing device configured to implement an execution of a method for automatically providing library package recommendations, the computing device comprising:
a processor;
a memory; and
a communication interface coupled to each of the processor and the memory, wherein the processor is configured to:
aggregate, via the communication interface, at least one set of source code from at least one repository, each of the at least one set of source code including a code snippet that relates to a portion of source code for a software program;
initiate, by using at least one model, code context analysis of the at least one code snippet to identify at least one alternative library package and at least one replaceable library package;
perform, by using the at least one model, implemented library analysis of the at least one code snippet to determine at least one complementary library package;
generate at least one recommendation for the at least one code snippet, the at least one recommendation including information that relates to the at least one complementary library package, the at least one alternative library package, and the at least one replaceable library package; and
associate, in the at least one repository, the generated at least one recommendation with the at least one code snippet.

11. The computing device of claim 10, wherein the at least one repository corresponds to at least one integrated development environment that facilitates development of the software program.

12. The computing device of claim 10, wherein, to initiate the code context analysis, the processor is further configured to:
generate, by using the at least one model, at least one tag for the at least one code snippet, the at least one tag including a textual description of a function that corresponds to the at least one code snippet; and
identify, in a library candidates dataset, at least one alternative library package and at least one replaceable library package based on the generated at least one tag.

13. The computing device of claim 12, wherein the at least one alternative library package includes at least one alternative function that is similar to a function that is implemented in a library package used by the at least one code snippet; and wherein the at least one replaceable library package includes at least one interchangeable function that is usable to replace the function that is implemented in the library package used by the at least one code snippet.

14. The computing device of claim 10, wherein, to perform the implemented library analysis, the processor is further configured to:
detect at least one implemented library package that is associated with the at least one code snippet; and
determine, by using the at least one model, at least one complementary library package that is frequently used together with the at least one implemented library package.

15. The computing device of claim 10, wherein the processor is further configured to:
receive an indication that at least one new library package has been added to the at least one repository;
determine whether the at least one new library package satisfies a predetermined threshold; and
update, based on a result of the determining, the at least one model with information that relates to the at least one new library package.

16. The computing device of claim 15, wherein the information that relates to the at least one new library package includes a weighted average of at least one co-occurring library package that is implemented together with the at least one new library package, the weighted average representing a number of implementations that includes the at least one co-occurring library package and the at least one new library package.

17. The computing device of claim 10, wherein the processor is further configured to:
generate at least one interface recommendation for the at least one code snippet, the at least one interface recommendation including at least one application programming interface that is operable with the at least one complementary library package, the at least one alternative library package, and the at least one replaceable library package; and
associate, in the at least one repository, the generated at least one interface recommendation with the at least one code snippet.

18. The computing device of claim 10, wherein the at least one model includes at least one from among a machine learning model, a mathematical model, a process model, and a data model.

19. A non-transitory computer readable storage medium storing instructions for automatically providing library package recommendations, the storage medium comprising executable code which, when executed by a processor, causes the processor to:
aggregate, via a communication interface, at least one set of source code from at least one repository, each of the at least one set of source code including a code snippet that relates to a portion of source code for a software program;

initiate, by using at least one model, code context analysis of the at least one code snippet to identify at least one alternative library package and at least one replaceable library package;

perform, by using the at least one model, implemented library analysis of the at least one code snippet to determine at least one complementary library package;

generate at least one recommendation for the at least one code snippet, the at least one recommendation including information that relates to the at least one complementary library package, the at least one alternative library package, and the at least one replaceable library package; and associate, in the at least one repository, the generated at least one recommendation with the at least one code snippet.

20. The storage medium of claim 19, wherein the at least one model includes at least one from among a machine learning model, a mathematical model, a process model, and a data model.

* * * * *